June 30, 1959     R. E. MOORE     2,892,974
MAGNETIC AMPLIFIER SENSING AND MOTOR CONTROL COMBINATIONS
Filed Aug. 10, 1956     2 Sheets-Sheet 1

Inventor:
Raymond E. Moore,
by Raymond A. Miles
His Attorney.

June 30, 1959  R. E. MOORE  2,892,974
MAGNETIC AMPLIFIER SENSING AND MOTOR CONTROL COMBINATIONS
Filed Aug. 10, 1956  2 Sheets-Sheet 2
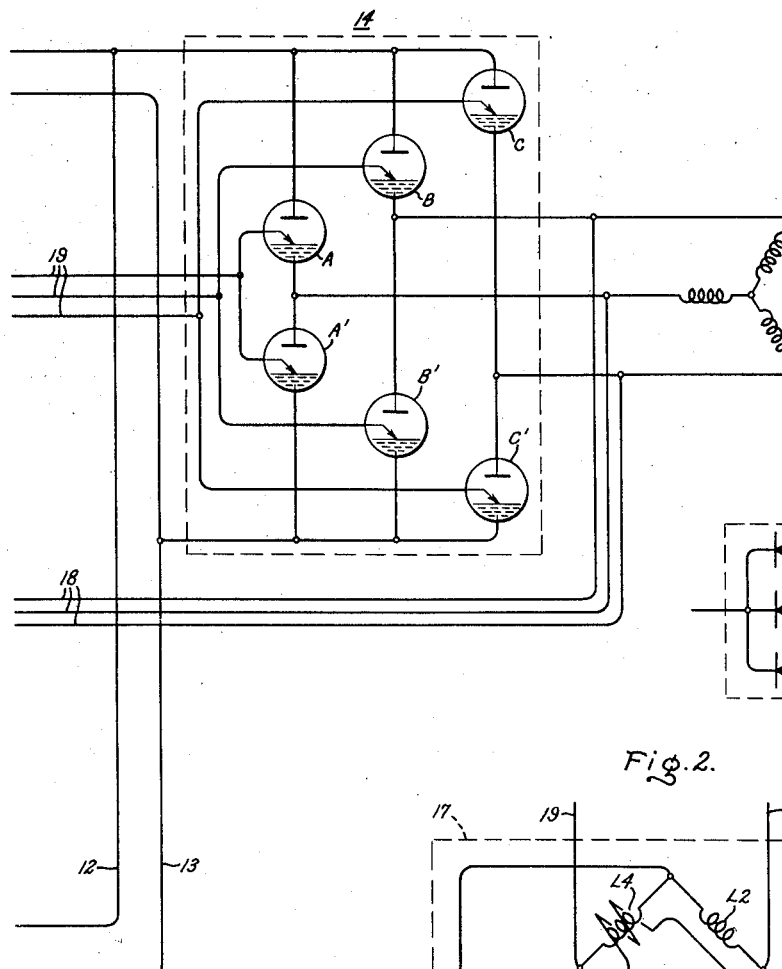
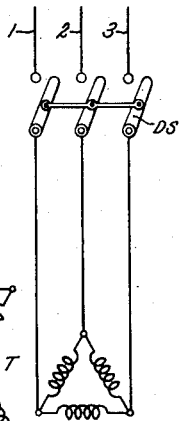
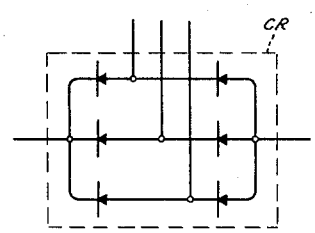
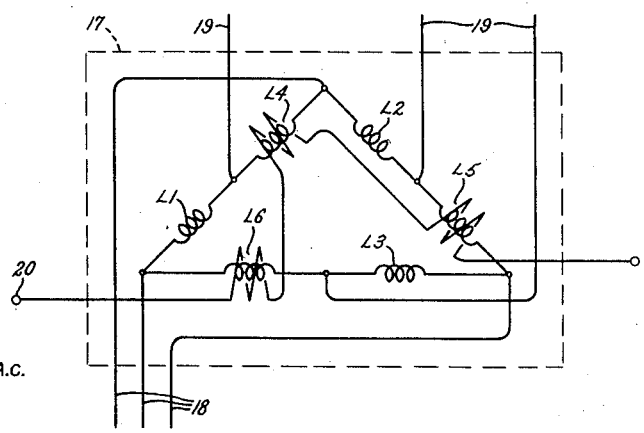
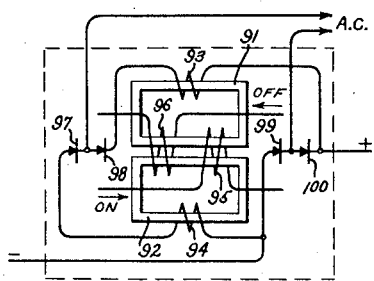
Inventor:
Raymond E. Moore,
by Raymond A. Miles
His Attorney.

United States Patent Office 2,892,974
Patented June 30, 1959

2,892,974

MAGNETIC AMPLIFIER SENSING AND MOTOR CONTROL COMBINATIONS

Raymond E. Moore, Roanoke, Va., assignor to General Electric Company, a corporation of New York Application August 10, 1956, Serial No. 603,350

12 Claims. (Cl. 318—259)

The invention relates to magnetic amplifier sensing and control combinations, particularly of the type where the magnetic amplifiers are interconnected in cooperating relation with circuit switching or controlling devices in order to perform alternative circuit selective or other controlling functions upon sensing one or more predetermined electrical quantities or circuit conditions.

Thus, many control systems utilize a suitable control regulator, for example, a magnetic amplifier having a variable input signal, for controlling some variable quantity or condition in accordance with variations in the input signal. But if for some reason the controlled variable should not accurately follow the input signal, then some corrective action such as an alternative circuit selection may become necessary or desirable.

One of the objects of the present invention is to provide an improved differential signal responsive magnetic amplifier sensing combination capable of sensing the need for such corrective action.

A further object is to provide a magnetic amplifier control combination for enabling the magnetic amplifier sensing combination to initiate the necessary corrective action but only when some further predetermined condition or conditions exist.

Although not limited thereto, the improved magnetic amplifier sensing control combinations of the present invention are particularly adapted for automatically controlling an adjustable voltage rectifier and the connection thereof with the armature of a separately excited direct current motor to regulate the speed during both motoring and regenerative braking operations. With a polyphase power rectifier of the usual electronic type, accurate control of its output and inverter voltage, and hence, of the resulting motor speed, can be accomplished by phase shifting control of the rectifier igniter excitation.

Heretofore, such a rectifier controlled variable speed motor drive has been used principally in nonreversing service. In such nonreversing service, the adjustable voltage rectifier can control the driving motor speed essentially in the same way as the adjustable voltage generator in the well-known and widely used Ward Leonard drive. Consequently, adjustable voltage power rectifiers have been finding increasing use for controlling nonreversing adjustable-speed motor drives in many industrial fields and particularly in heavy industry.

But when regenerative braking and reversal of the motor are required, heretofore some control difficulties have been encountered. Hence, it has been the common practice to provide duplicate adjustable voltage power rectifiers connected back-to-back with the motor armature and specially controlled so as to be alternately and reversely effective. But such duplication of the power rectifiers and their special phase shifting control necessarily increases the over-all cost of the regenerative and reversible drive equipments.

The various control difficulties that have heretofore been encountered in producing the desired reversible motor speed control and also regenerative operation with only one rectifier are due to the facts that a single rectifier inherently is a unidirectional current device, and inverter operation thereof is subject to inherent technical limitations. In order to produce either regenerative braking or operation of the motor in reverse directions with only one rectifier, suitable reversing switches must be operated to reversely connect the single rectifier with the motor armature. Consequently, switching difficulties are likely to occur unless such reversing can be automatically accomplished only when the motor armature current is substantially zero. Furthermore, for effective regenerative braking of the motor, the adjustable voltage single rectifier must be controlled and coordinated for inverter operation in order to return regenerative motor armature current to the alternating current supply lines as the motor slows down and its counterelectromotive force decreases.

But the inherent advantages of a single controlled voltage rectifier drive including fast response, high efficiency, low installation and maintenance costs, and the capacity for large momentary overloads, have long favored its application in variable speed motor drive service where either motor regeneration or reversal is required.

Hence, another object of the present invention is to provide improved magnetic amplifier selective sensing and control combinations capable of enabling a single adjustable voltage rectifier to effect not only selective speed control of the motor in either direction, but also an automatically monitored regenerative braking of the motor either when a decrease in motor speed is selected in either driving direction or when motor reversal is selected.

Thus, with the magnetic amplifier selective sensing and control improvements of the present invention, the field of application of the single controlled voltage rectifier adjustable speed drive can be materially widened, since the desirable directional and speed control and regenerative braking characteristics of the Ward Leonard drive can be substantially duplicated entirely automatically while retaining all the advantages of the single rectifier controlled drive noted above.

A further object is to provide a drive directional and speed selective control switch mechanism with an improved automatic sensing and control combination of magnetic amplifiers and interlocking relays capable of automatically sensing when the motor armature connections with the rectifier should be reversed in order to drive in the selected direction, as well as when regenerative braking is required to reduce the motor speed in either direction automatically but capable of preventing the reversing of the armature connections while the rectifier is conducting current or while the rectifier excitation is such that the reversed armature cannot safely be allowed to regenerate.

The novel features believed characteristic of the present invention are set forth with particularity in the appended claims. The invention itself, however, together with further objects and advantages thereof may best be understood by referring to the following description taken in conjunction with the accompanying drawings in which Figs. 1a and 1b on separate sheets when placed in adjacent relation constitute a schematic representation of a preferred embodiment of the invention in a speed and regenerative braking control system for the roll driving motor of a reversing rolling mill.

Fig. 2 shows a typical form of phase shifting control suitable for producing inverter action as well as adjusting the voltage of the power rectifier that energizes the armature of the separately excited roll driving motor.

Fig. 3 shows a typical form of three-phase rectifier for supplying direct current to the separately excited motor field as well as energization for various control windings of the various magnetic amplifier sensing and control combinations of the present invention.

Fig. 4 shows a typical form of magnetic amplifier suitable for use in the control system of Figs. 1a and 1b.

Figure 1A:
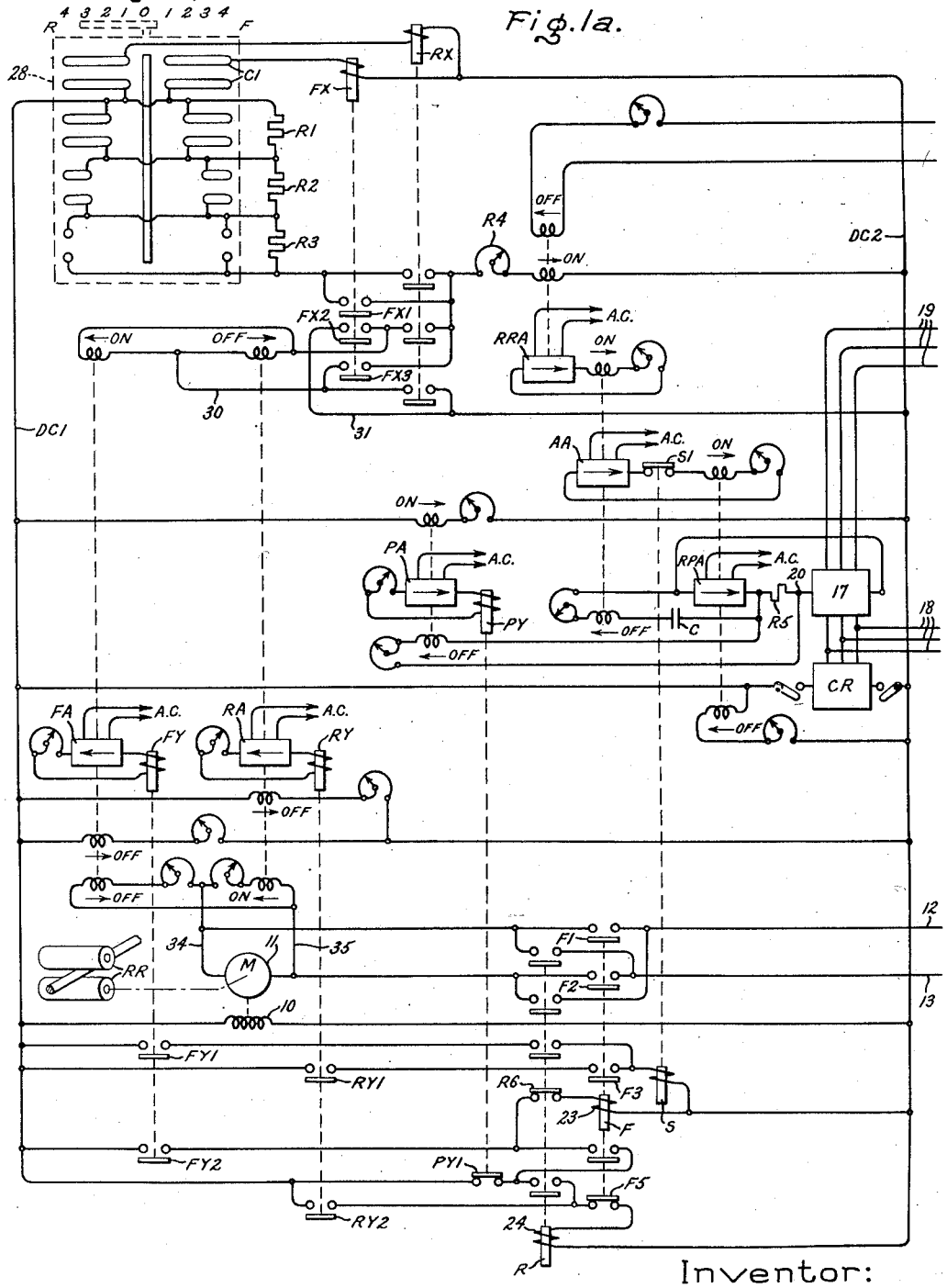

Referring to Figs. 1a and 1b, I have shown my invention in one form as applied to the speed and regenerative braking control of the rolling mill driving motor M that is shown schematically as connected to drive the reversible rolls RR of a rolling mill. The motor M is provided with a separately excited shunt field winding 10 that is continuously energized from the direct current lines DC1 and DC2 that are supplied from the usual three-phase control rectifier CR shown in Fig. 3. The motor armature 11 is connected by means of the electromagnetically operated reversing switches F and R to be energized through the lines 12 and 13 by the adjustable voltage three-phase power rectifier indicated generally by the reference character 14 shown in Fig. 1b. Power is supplied to the rectifier 14 from the three-phase A.-C. supply lines 1, 2, 3 through the disconnecting switch DS and the power transformer T which may be of any suitable form.

The power rectifier 14 is shown as of the usual three-phase form having the three ignitrons A, B, C of the mercury arc type for conducting the positive half cycles, and the three ignitrons A', B', C' of the same type for conducting the negative half cycles. The output voltage of the power rectifier 14 is adjusted by means of a suitable form of phase shift control 17 as indicated in Fig. 1a and shown schematically in Fig. 2. In order to obtain phase shift control, the three-phase A.-C. voltage applied to the power rectifier ignitrons is also applied to the phase shift control network 17 through the lines 18 and is modified by the phase shift network 17 shown in Fig. 2, so as to produce the desired phase shift in the excitation of the igniter elements of each of the ignitron tubes ABC, and A'B'C' through the lines 19. As is well known in the art, these igniters are associated with each anode of the ignitrons and require a positive pulse of current once each cycle to start the mercury arc at the beginning of the conducting period. The phase shift network 17 as shown in Fig. 2 consists of fixed reactors L1, L2, L3 and saturable reactors L4, L5, L6 that are used to shift the rectifier firing point on the A.-C. sine wave as desired and thereby control the average magnitude of the D.-C. output voltage. The phase shift is controlled as a function of the magnitude of the current supplied to the saturating winding circuit 20 of the saturable reactors. With zero or minimum current in the saturating winding circuit, the phase shift network 17 provides for the maximum inverter voltage at the start of the regenerative braking operation of motor M as will be more fully described hereinafter. The requirement for regenerative braking of the driving motor M with only one three-phase rectifier 14, which inherently cannot accept reverse current, is fulfilled through inverter action and the armature reversing switches F and R under the control of the improved magnetic amplifier sensing and control combinations of the present invention.

As shown in Fig. 1a, the operating electromagnets of the reversing switches F and R are provided with windings 23 and 24 having alternative energizing circuits controlled respectively by the contacts of relays FY and RY. Each of these direction selective relays has a corresponding energizing magnetic amplifier FA and RA, provided with differential control windings, as well as an "off" biasing winding for calibrating purposes. These windings respectively are indicated as associated with the corresponding magnetic amplifier by the dotted lines in Fig. 1a. The upper pair of respective "on-off" control windings for amplifiers FA and RA are interconnected to be reversely energized under the control of the electromagnetic relays FX and RX in order to selectively effect the initial and alternative energization of the circuits of winding 23 of the forward switch F or of the winding 24 of the reverse switch R, depending upon whether the master controller indicated generally by the reference character 28 is moved from the "off" position in which it is shown in the forward direction or in the reverse direction.

The multi-position master controller 28 also is provided with suitable contacts for progressively short circuiting the resistors R1, R2, R3 that serve to control a variable quantity in accordance with the movement of the controller, i.e., the operating speed of the motor M, depending upon the position 1, 2, 3, or 4, to which the controller is operated by varying the reference voltage applied to the "on" winding of the magnetic amplifier RRA that controls the phase shift. At the same time a signal voltage that varies as a function of the movement of controller 28 is applied to the upper pair of reversible "on-off" control windings of the magnetic amplifiers FA and RA.

In order to control the rate of change of the saturating current supplied to the phase shift saturating winding circuit 20, the magnetic amplifier RRA controls the "on" winding of the magnetic amplifier AA which in turn controls the "on" winding of the magnetic amplifier RPA which finally energizes the phase shift control circuit 20. As shown in Fig. 1a, the "off" winding of the magnetic amplifier AA is energized by the output voltage of the magnetic amplifier RPA through a circuit including the rate control capacitor C in order to provide a substantially constant rate of change of the rectifier voltage when the master controller 28 is operated at any different rate to any speed control position. This improved rate of change control magnetic amplifier combination is more fully described and claimed in the application of Burnette P. Chausse, Serial No. 605,833, filed August 23, 1956, and assigned to the same assignee.

*Operation*

Assuming the operator calls for forward operation by moving the master controller to any one of the forward positions 1, 2, 3, or 4, the relay FX will be picked up due to energization from lines DC1, DC2 through contacts C1.

The pickup of relay FX does two things. First, it energizes the upper pair of "on-off" control windings for the magnetic amplifiers FA and RA in the directions indicated by the arrows with a voltage that varies as a function of the movement of the master controller 28 to the selected position. Also it energizes the "on" control winding of amplifier RRA with a related voltage. Thus, assuming the master controller 28 is operated in a forward direction only to position 1, the pickup of relay FX will close contacts FX1, FX2 and FX3 substantially simultaneously. The closure of contact FX1 energiezs the "on" winding of the magnetic amplifier RRA through a circuit extending from line DC1 through resistors R1, R2, R3 and also the adjustable resistor R4. The simultaneous closure of contact FX3 applies the reference signal voltage as controlled solely by the resistors R1, R2, R3 through the conductor 30 to the upper pair of control windings of magnetic amplifiers FA and RA in parallel, the circuit being completed through contact FX2 and conductor 31 to line DC2. This turns magnetic amplifier FA on to energize relay FY and thereby close contact FY2 to energize the operating winding 23 of the forward switch F. The resulting closure of contacts F1 and F2 connects the armature 11 of motor M to the output conductors 12 and 13 of the rectifier 14 to produce operation of the motor M in the forward direction.

The concomitant energization of the "on" windings of magnetic amplifiers RRA, AA, and RPA serves to supply a varying phase shift control voltage to the saturating winding circuit 20 of the phase shift network 17. This control voltage increases to a final magnitude determined by the resistors R1, R2, R3 at a rate determined by the charging of the capacitor in the feedback circuit including the "off" winding of the magnetic amplifier AA. The corresponding increase in voltage output of the rectifier 14 will thus be applied to motor armature 11 to accelerate the motor to the final speed determined by the control exerted by the reference voltage control resistors R1, R2, R3. In case the master controller 28 is then advanced progressively to the positions 2, 3 and 4, the motor will be accelerated in a similar manner to each corresponding higher speed by the successive short circuiting of the resistors R1, R2, R3, thereby producing a corresponding increase in the voltage applied to the saturating winding circuit 20 of the phase shift network 17 with a corresponding increase in the output voltage of the rectifier 14.

In case the master controller 28 is initially operated in the reverse direction, substantially the same procedure will occur except that relay RX is picked up and amplifier RA is turned on to pick up relay RY and thereby close the reverse switch R.

In order to maintain the armature 11 of motor M energized from the rectifier 14 in either direction independently of the direction selective magnetic amplifiers FA and RA, the relay PY is provided. The magnetic amplifier PA for energizing relay PY is normally biased "on" by its "on" biasing winding which is interconnected between the lines DC1, DC2. As a result relay PY is normally picked up. But when the output of magnetic amplifier RPA produces a current flow through the resistor R5, the "off" winding of magnetic amplifier PA becomes energized to turn the amplifier PA off and thereby drop out relay PY. The resulting closure of contact PY1 (assuming forward operation) serves to maintain the energization of the circuit of operating winding 23 through contacts F3 and R4 independently of the relay contact FY2 and, therefore, independently of the direction selective magnetic amplifier FA. As will be seen, this enables the reversing switches F and R to be operated to effect regenerative braking of the motor M in the following manner:

Regenerative braking

In case the master switch 28 (assuming forward operation) is moved in a direction to reduce the speed of motor M, as for example, from any higher numbered forward position to a lower numbered position, the magnitude of the reference voltage signal applied to the "on" winding of magnetic amplifier FA and the "off" winding of magnetic amplifier RA will be correspondingly decreased. The differential pair of "on-off" windings for these magnetic amplifiers FA and RA are connected to be responsive to the voltage across the motor armature 11 by the conductors 34 and 35. As a result the "off" differential winding of magnetic amplifier FA can predominate sufficiently to turn the amplifier FA off and thereby deenergize the relay FY. At the same time the "on" winding of amplifier RA can predominate over the reduced energization of the "off" control winding so as to turn on amplifier RA and thereby pick up relay RY. This will close contacts RY1 and RY2. The closure of contact RY1 while reversing switch F is maintained energized by contact PY1 will energize relay S through contact F3. The resulting pickup of contact S1 will open the "on" control winding energizing circuit of amplifier RPA, thereby reducing the output thereof to a minimum. This does two things. First, it reduces the energization of the saturating winding circuit 20 of the phase shift network 17 to a minimum. As a result, the rectifier 14 will produce the maximum inverter voltage, as previously pointed out.

The second thing is the resulting decrease in the energization of the "off" winding of amplifier PA sufficiently to enable the "on" winding to turn this amplifier on and pick up relay PY, thereby opening contact PY1 and deenergizing the operating winding 23 of the forward switch F. As soon as the normally closed contact F5 closes, the energizing circuit for the operating winding 24 of the reversing switch R is completed, since relay RY is picked up and contact RY2 is closed. The resulting pickup of switch R will reverse the connection of the motor armature 11 with the output connections 12 and 13 of rectifier 14.

The dropping out of switch F will open the energizing circuit of relay S, thereby reclosing contact S1 to again energize the "on" winding of the magnetic amplifier RPA. As a result the voltage applied to the saturating winding circuit 20 of the phase shift network 17 will be increased at a rate determined by the feedback capacitor C, thereby progressively reducing the inverter voltage of rectifier 14 until it is less than the counterelectromotive force of the motor armature 11. Under these conditions regenerative braking of the motor M will occur with the regenerative braking current fed back through the rectifier 14 due to inverter action thereof to the A.-C. supply lines until the motor speed has been reduced to the value at which the counterelectromotive force energization of the differential "on-off" windings of amplifiers FA and RA no longer predominates over the upper pair of "on-off" control windings that are energized in accordance with the adjustable reference voltage. Under such conditions the amplifier RA will be turned off and the amplifier FA will be turned on. The relay RY responds to the turning off of amplifier RA to open contact RY2, thereby deenergizing the operating electromagnet of switch R. As soon as contact R6 is closed, the operating electromagnet 23 of the forward switch F will be energized, since contact FY2 is closed.

In case the master switch 28 should be moved from any forward position to any reverse position, regenerative braking of the motor M is obtained in exactly the same way as just described. But in this case the regenerative braking will continue until the motor speed is reduced to zero, and the reverse switch R will be maintained energized so as to accelerate the motor M in the reverse direction as the energization of the saturating winding circuit 20 of the phase shift network 17 is progressively increased to change from inverter action to rectifying action, the rate of change being regulated by the feedback circuit through capacitor C and the "off" winding of amplifier AA in the manner previously described.

Since ordinarily the rolling mill will normally be started in the forward direction, it may be desirable to adjust the bias winding of amplifier FA so that relay FY is normally picked up. Thus, when the master switch 28 is in the "off" position, relay FY may be normally picked up and relay RY may be normally dropped out. Under these conditions the forward switch F will be picked up by closure of contact FY2, and the motor armature 11 will normally be connected to the rectifier output connections 12 and 13 ready for operation in the forward direction as soon as the master switch 28 is moved to the desired speed regulating position.

Each of the magnetic amplifiers referred to above may be of the well-known bridge type schematically shown in Fig. 4. Briefly, this type of magnetic amplifier comprises two separate magnetic cores 91 and 92 having the reactor windings 93 and 94 as well as the control winding 95, and reference or biasing winding 96 interlinked therewith as shown. The reactor windings 93, 94 are interconnected with the rectifiers 97, 98, 99, 100, as shown, to form a bridge circuit that is continuously energized from a suitable alternating current source connected between the rectifiers. A load circuit is interconnected with the bridge, as shown, to supply energization to the electromagnetic relays that are energized under control of the magnetic amplifier with direct current of a polarity as indicated.

The biasing winding 96 serves to establish a reference magnetization of the cores 91, 92 opposite to the magnetizations produced by the reactor windings 93 and 94, and also in opposition to the magnetization produced by the control winding 95. Consequently, the magnitude of the signal energizing the control winding 95 required to trigger the amplifier to produce load current can be varied by adjustment of the energization of the biasing winding 96 in the manner previously explained.

While I have shown and described a preferred form of my invention by way of illustration, many modifications will occur to those skilled in the art. I, therefore, contemplate by the appended claims to cover all such modifications as fall within the true spirit and scope of my invention.

What I claim as new and desire to secure by Letters Patent of the United States, is:

1. In combination, an electric circuit having energizing means including a first magnetic amplifier provided with an "on" control winding and an "off" control winding for controlling the voltage of the circuit, means including an adjustable element for variably controlling the energization of the "on" winding, means for producing separate electric signals proportional to the adjustment of the element and to the magnitude of the said voltage, and a switching device for controlling the circuit having automatic operating means including a second magnetic amplifier provided with control windings differentially energized by said signals for operating the switching device when the variable electrical quantity signal dominates.

2. In combination, an electric circuit means including a first magnetic amplifier provided with an "on" control winding for controlling the magnitude of a variable electrical quantity of the circuit as a function of the energization of the "on" winding, means including an adjustable element for variably controlling the energization of said "on" winding to provide full range adjustable output means for producing separate electric signals proportional respectively to the energization of said "on" control winding and to the magnitude of said electrical quantity, a switching device for controlling said circuit, and automatic means including a second magnetic amplifier provided with control windings differentially energized by said signals for operating said switching device upon a predetermined relation of said signals.

3. In an alternative circuit control system, two circuits having energization control means including respectively two magnetic amplifiers provided with input signal control means for initially energizing one circuit, a third magnetic amplifier having means controlled thereby for independently maintaining the one circuit energized and controlling energization of the other, means including differential signal input control means for the two magnetic amplifiers to automatically preset the other circuit for energization, and electroresponsive sensing means responsive to such presetting while the one circuit is energized for varying the signal input of the third amplifier to automatically effect deenergization of the one circuit and energization of the other circuit.

4. In a condition responsive alternative circuit control system, two circuits having selective energization control means including respectively two magnetic amplifiers provided with reversible input signal control means for initially energizing either circuit, means including a third magnetic amplifier having input signal control means for independently maintaining either circuit energized and preventing energization of the other, means including differential input signal control means for causing the alternative magnetic amplifiers to automatically select the other circuit for energization in response to a predetermined condition, and means responsive to such selection while either circuit is maintained energized for varying the signal input of the circuit energization maintaining amplifier to automatically effect deenergization of the initially selected circuit and energization of the other circuit.

5. In a dual condition responsive alternative circuit control system, selective energization control means including alternative magnetic amplifiers having interconnected control windings provided with reversible input signal control means for initially selecting either circuit for energization, means including a magnetic amplifier having an input signal dependent upon a first variable condition for maintaining the initially selected electromagnet energized and for preventing energization of the other circuit under control of the alternative amplifiers, means including differential input signal means for the alternative magnetic amplifiers for automatically selecting the other circuit for energization in response to the relation of a second variable condition to the first variable condition, and means responsive to such selection while either circuit is energized for varying the first condition to render the electromagnet energization maintaining amplifier effective to automatically effect deenergization of the initally selected circuit and the energization of the other circuit.

6. In a separately excited reversible motor speed control system, means for variably energizing the motor armature to vary the motor speed in either direction including an adjustable voltage rectifier having an igniter phase shift adjustable control element movable from an "off" position in either direction to correspondingly increase the rectifier voltage applied to the motor armature, selective "forward" and "reverse" control relays having energizing connections selectively controlled by said element, independently operable "forward" and "reverse" control relays, each having an energizing magnetic amplifier provided with an "off" biasing winding and an "on" control winding connected to be energized as a function of the movement of the element in each direction when the corresponding selective control relay is operated and a differential control winding energized in accordance with the motor voltage, and means including electromagnetically operated reversing switches having energizing connections under the selective control of the independently operable relays for controlling the connections of the motor armature with the rectifier and for automatically reversing the motor armature connections to effect regenerative braking of the motor when the control element is adjusted towards the "off" position.

7. In a control system for an electric motor, an adjustable voltage rectifier for supplying the armature of the motor, a source of adjustable reference voltage, means for deriving from the motor a signal voltage representative of its speed, a phase-shifting device for controlling the output of said rectifier, first magnetic amplifier means responsive to said reference voltage for controlling the phase of the output voltage of said phase-shifting device to conform the output voltage of said rectifier to said reference voltage, and means responsive to a relationship of said signal and reference voltages representative of a motor speed exceeding the value represented by said reference voltage for retarding the phase of the output voltage of said phase-shifting device to effect inverter operation of said rectifier comprising second magnetic amplifier means having a turn-on winding supplied with said reference voltage, a turn-off winding supplied with said derived voltage, and means controlled by the output of said second magnetic amplifier means for controlling the magnetization of said first magnetic amplifier means.

8. In a control system for an electric motor, an adjustable voltage rectifier for supplying the armature of the motor, a source of adjustable reference voltage, means for deriving from the motor a signal voltage representative of its speed, a phase-shifting device responsive to said reference voltage for controlling the output of said rectifier, reversing switching means for controlling the connection of the armature of the motor to the rectifier for rotation in either direction, and means responsive to a relationship of said reference and signal voltages representative of a motor speed exceeding the value represented by said reference voltage for retarding the phase of the output voltage of said phase-shifting device to effect inverter operation of said rectifier and for controlling said reversing switching means to reverse the connection of the armature of said motor to said rectifier to effect regenerative braking of the motor.

9. In a control system for an electric motor, an adjustable voltage rectifier for supplying the armature of the motor, a source of adjustable reference voltage, means for deriving from the motor a signal voltage representative of its speed, a phase-shifting network responsive to said reference voltage for controlling the output of said rectifier, reversing switching means for controlling the connection of the armature of the motor to the rectifier for rotation in either direction and means responsive to a predominance of said signal voltage over said reference voltage for retarding the phase of the output voltage of said phase-shifting network to reduce the output voltage of said rectifier and for controlling said reversing switching means to reverse the connections of the armature of the motor to said rectifier to effect regenerative braking of the motor and responsive to disappearance of the predominance of said signal voltage over said reference voltage for controlling said reversing switching means to restore the original connections of said armature to said rectifier.

10. In a control system for an electric motor, an adjustable voltage rectifier for supplying the armature of the motor, a source of adjustable reference voltage, means for deriving from the motor a signal voltage representative of its speed, a phase-shifting network responsive to said reference voltage for controlling the output of said rectifier, reversing switching means for controlling the connection of the armature of the motor to the rectifier for rotation in either direction, means responsive to a predominance of said signal voltage over said reference voltage for retarding the phase of the output voltage of said phase-shifting network to reduce the output voltage of said rectifier and for controlling said reversing switching means to reverse the connections of the armature of the motor to said rectifier to effect regenerative braking of the motor, and means responsive to the reversing operation of said armature connections for controlling said phase-shifting network to advance the phase of the output voltage of said phase-shifting network.

11. In a control system for an electric motor, an adjustable voltage rectifier for supplying the armature of the motor, a source of adjustable reference voltage, means for deriving from the motor a signal voltage representative of its speed, a phase-shifting device responsive to said reference voltage for controlling the output of said rectifier, reversing switching means for controlling the connection of the armature of the motor to the rectifier for rotation in either direction, and means responsive to a relationship of said reference and signal voltages representative of a direction of rotation of the motor opposite to that represented by the reference voltage for retarding the phase of the output voltage of said phase-shifting device to effect inverter operation of said rectifier and for controlling said reversing switching means to reverse the connection of the armature of the motor to said rectifier to effect regenerative braking of said motor to rest and acceleration in the reverse direction.

12. In a control system for an electric motor, an adjustable voltage rectifier for supplying the armature of the motor, a source of adjustable reference voltage, means for deriving from the motor a signal voltage representative of its speed, a phase-shifting network responsive to said reference voltage for controlling the output of said rectifier, reversing switching means for controlling the connection of the armature of the motor to the rectifier for rotation in either direction, and means responsive to a predominance of said signal voltage over said reference voltage for retarding the phase of the output voltage of said phase-shifting network to reduce the output voltage of said rectifier and for controlling said reversing switching means to reverse the connections of the armature of the motor to said rectifier to effect regenerative braking of the motor comprising magnetic amplifier means having a turn-on winding supplied with said reference voltage, a turn-off winding supplied with said derived signal voltage and electroresponsive means controlled by the output of said amplifier means for controlling said reversing switching means and said phase-shifting device.

References Cited in the file of this patent

UNITED STATES PATENTS

| | | |
|---|---|---|
| 2,276,888 | Sonnemann | Mar. 17, 1942 |
| 2,421,632 | Livingston | June 3, 1947 |
| 2,788,479 | Montgomery | Apr. 9, 1957 |
| 2,805,386 | Pfaff | Sept. 3, 1957 |